(12) United States Patent
Arbuckle et al.

(10) Patent No.: US 7,762,731 B2
(45) Date of Patent: Jul. 27, 2010

(54) ENVIRONMENTALLY SEALED ENCLOSURE (75) Inventors: James F. Arbuckle, Clovis, CA (US);
Brook H. Cavalla, Clovis, CA (US);
William L. Forman, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 158 days.

(21) Appl. No.: 12/210,039

(22) Filed: Sep. 12, 2008

(65) Prior Publication Data

US 2010/0067898 A1    Mar. 18, 2010

(51) Int. Cl.
*G03B 17/02* (2006.01)
*H04N 5/225* (2006.01)
*F16J 15/00* (2006.01)

(52) U.S. Cl. .................. 396/427; 396/535; 348/373; 277/628

(58) Field of Classification Search .................. 396/25, 396/27, 427–428; 348/373–376; 277/628, 277/921
See application file for complete search history.

(56) References Cited

U.S. PATENT DOCUMENTS

| 3,019,715 | A | | 2/1962 | Arnold et al. |
| 3,567,949 | A | | 3/1971 | Forgotson et al. |
| 3,613,538 | A | | 10/1971 | Horberg, Jr. |
| 3,720,147 | A | | 3/1973 | Bemis |
| 3,732,368 | A | | 5/1973 | Mahlab |
| 4,225,886 | A | | 9/1980 | Smith |
| D262,117 | S | | 12/1981 | Sasaki |
| 4,414,576 | A | * | 11/1983 | Randmae .................. 348/373 |
| D273,113 | S | | 3/1984 | Knoll |
| 4,543,609 | A | | 9/1985 | Smith |
| 4,653,709 | A | | 3/1987 | Paldino |
| 4,736,218 | A | | 4/1988 | Kutman |
| 4,920,367 | A | | 4/1990 | Pagano |
| D307,915 | S | | 5/1990 | Kuester, III |
| 4,928,174 | A | | 5/1990 | Smith |
| 4,974,088 | A | | 11/1990 | Sasaki |
| 4,978,984 | A | | 12/1990 | Brookfield |
| 4,984,089 | A | | 1/1991 | Stiepel et al. |
| D315,742 | S | | 3/1991 | Matsumoto |
| 5,107,286 | A | | 4/1992 | Sergeant et al. |

(Continued)

FOREIGN PATENT DOCUMENTS

JP        5-183787       7/1993

OTHER PUBLICATIONS

PELCO, Shortform Catalog 2001, Clovis, California, USA.

*Primary Examiner*—W. B. Perkey
*Assistant Examiner*—Dennis Hancock
(74) *Attorney, Agent, or Firm*—Paul T. Kashimba, Esq.

(57) ABSTRACT

Embodiments of the present invention provide systems, methods and apparatus for providing reliable sealed enclosures for surveillance cameras that are capable of protecting an internal surveillance camera and related electronics from harsh external environmental conditions without using adhesives using a unique a sealing gasket that is sandwiched between upper and lower housing parts of a camera enclosure. The unique sealing gasket includes a flexible portion corresponding to the surfaces of the housing parts to be engaged that is generally perpendicularly attached to a front panel. The front panel has a central viewing pane, and a peripheral flexible sealing surface. A unique aspect of the sealing member of embodiments of the present invention is the inclusion of the front panel, viewing pane and upper/lower housing seal in a single member.

23 Claims, 12 Drawing Sheets

U.S. PATENT DOCUMENTS

| | | | |
|---|---|---|---|
| 5,115,263 A * | 5/1992 | Bernhardt et al. ............ 396/535 |
| 5,121,215 A | 6/1992 | Boers et al. |
| 5,159,368 A | 10/1992 | Zemlin |
| 5,181,120 A | 1/1993 | Hickey et al. |
| 5,214,245 A | 5/1993 | Bernhardt et al. |
| 5,223,872 A | 6/1993 | Stiepel et al. |
| 5,224,675 A * | 7/1993 | Ellenberger et al. ...... 248/183.4 |
| D340,940 S | 11/1993 | Ellenberger et al. |
| 5,394,184 A | 2/1995 | Anderson et al. |
| 5,394,208 A | 2/1995 | Campbell |
| 5,394,209 A | 2/1995 | Stiepel et al. |
| 5,418,567 A | 5/1995 | Boers et al. |
| D374,023 S | 9/1996 | Beck et al. |
| 5,563,659 A | 10/1996 | Bernhardt et al. |
| 5,589,875 A | 12/1996 | Fujita et al. |
| 5,617,762 A | 4/1997 | Kirsch |
| 5,631,699 A | 5/1997 | Saito |
| D385,571 S | 10/1997 | Abrams |
| 5,689,304 A | 11/1997 | Jones et al. |
| 5,689,734 A | 11/1997 | Bauer et al. |
| D387,789 S | 12/1997 | Sumida et al. |
| 5,734,335 A | 3/1998 | Brogi et al. |
| D403,340 S | 12/1998 | Arbuckle |
| 5,850,579 A | 12/1998 | Melby et al. |
| 5,852,754 A | 12/1998 | Schneider |
| 5,864,365 A | 1/1999 | Sramek et al. |
| 5,905,923 A | 5/1999 | Chitsaz et al. |
| 5,966,176 A * | 10/1999 | Chow et al. .................. 348/373 |
| 6,019,524 A | 2/2000 | Arbuckle |
| 6,027,257 A | 2/2000 | Richards et al. |
| 6,061,087 A | 5/2000 | Schieltz et al. |
| 6,234,691 B1 | 5/2001 | Jones et al. |
| 6,354,749 B1 | 3/2002 | Pfaffenberger, II |
| 6,375,369 B1 | 4/2002 | Schneider et al. |
| D457,885 S | 5/2002 | Yanagihara et al. |
| D472,260 S | 3/2003 | Higgins et al. |
| D473,873 S | 4/2003 | Pokrovsky et al. |
| D476,025 S | 6/2003 | Ford |
| 6,634,804 B1 | 10/2003 | Toste et al. |
| D486,173 S | 2/2004 | Toste et al. |
| 6,715,939 B2 | 4/2004 | Ford |
| 6,805,498 B2 | 10/2004 | Ford |
| 6,830,387 B2 | 12/2004 | Rife |
| 6,894,724 B2 | 5/2005 | Patel et al. |
| 7,066,663 B2 | 6/2006 | Cheng |
| 2001/0015766 A1 * | 8/2001 | Marchesini ................. 348/373 |
| 2001/0022627 A1 | 9/2001 | Bernhardt |
| 2002/0140847 A1 * | 10/2002 | Alessio et al. .............. 348/373 |
| 2002/0140848 A1 | 10/2002 | Cooper et al. |
| 2004/0263623 A1 | 12/2004 | Arbuckle |

\* cited by examiner

DETAIL B
SCALE 6.000
Fig. 13

DETAIL A
SCALE 6.000
Fig. 15

ENVIRONMENTALLY SEALED ENCLOSURE

BACKGROUND OF THE INVENTION

1. Field of the Invention

The present invention relates to surveillance camera systems, and more particularly to an environmentally sealed enclosure for a surveillance camera for outdoor use.

2. Description of the Prior Art

The use of surveillance cameras and related systems is becoming increasingly more prevalent. Not only are surveillance cameras used in such traditional institutions as banks and casinos, but their use has spread to retail and business establishments, indoor and outdoor entry points, airport security checkpoints, government buildings, parking lots, and the like.

In the field of surveillance cameras, it is often necessary for a surveillance camera to be mounted in a housing that is located in a remote or outdoor location (such as the top of a pole, on a ledge, on the side of a wall, the underside of an eave, etc.) where it is exposed to wide variations in temperature, pressure and humidity. Changes in pressure and humidity can be particularly harmful to the delicate internal electronics and camera optics of surveillance camera systems, and that may impair, damage or shorten the life of these components. Some indoor environments may also be hazardous to the camera and internal electronics, such as a foundry or factory where toxic gasses, dust and/or debris are present in the air.

Many existing camera housing enclosures include fans and/or heaters to help control the interior environment, but they are not sealed. As a result, such enclosures do not provide adequate protection to the camera inside, and cannot be used in harsh or extreme climactic conditions such as those where there is considerable precipitation, humidity, ice or other moisture, where the temperature is very hot or very cold, and/or where there are wide variations in temperature.

Other existing camera housings are sealed in order to prevent moisture and debris from entering the enclosure. However, because of the way existing sealed camera enclosures are manufactured and assembled, failures in the seals may occur after a relatively short period of time particularly in harsh environments such as those described above. A typical elongated surveillance camera housing may include a one or two-part lower housing, a front wall, a rear wall, and an upper housing or lid. Each of these housing parts is ordinarily made of a rigid material such as metal or plastic. A viewing panel is usually provided in the front wall. Thus, a first seal is needed around the front viewing panel where it attaches to the front wall. Another longitudinal seal (or two) is needed between the upper and lower housing parts when they are coupled together. A third seal is needed around the front wall where it engages the front end of the coupled housing, and a fourth seal is needed around the rear wall where it engages the back end of the coupled housing. Such enclosures have numerous potential failure points where the integrity of a seal may be lost. These include any uneven or poorly constructed surfaces of any housing part that is to be sealed against another housing part, joints or poorly mated surfaces on or along such housing parts, and/or junctions where one seal engages against another seal (such as where a longitudinal seal between upper and lower housing parts abuts the seal for the front or back wall of the enclosure). A seal failure at any of these points will compromise the integrity of the enclosure, and expose the electronics and camera inside to moisture, debris and/or other environmental elements that may impair, damage or shorten the life of these components.

Adhesives may be used to adhere a sealing structure to a housing part, but are generally disfavored for many reasons. In some cases, adhesives may wear out or fail more readily than the sealing structure to which they are adhered. The adhesive may not bond correctly, or the wrong adhesive may be used, which can actually accelerate a seal failure. Moreover, if a sealing structure must be replaced, remnants of any adhesive used must be removed from the housing part before a new sealing structure is installed. Otherwise, these remnants may become potential failure points for the new seal. For these reasons and others, adhesives generally do not provide the necessary reliability for sealing outdoor surveillance camera enclosures.

It is therefore desirable to provide a sealed surveillance camera housing having a minimal number of potential failure points along any sealed surfaces to provide protection for the internal electrical and mechanical components from exposure to precipitation, moisture and other external foreign contaminants. It is also desirable to provide improved and reliable sealing structures for such camera housings. It is also desirable to provide camera housing sealing structures that do not rely on adhesives.

SUMMARY OF THE INVENTION

Embodiments of the present invention provide systems, methods and apparatus for providing reliable sealed enclosures for surveillance cameras that are capable of protecting an internal surveillance camera and related electronics from harsh external environmental conditions without using adhesives. In one aspect, a sealing member or gasket is provided to be engaged between upper and lower housing parts of a camera enclosure, the sealing member having a flexible portion corresponding to the surfaces of the housing parts to be engaged, the flexible portion being attached to or integrated into a front panel having a central viewing pane, and another flexible portion being provided around the front panel. In another aspect, an elongated camera housing is provided having upper and lower housing cups that couple at the rear and engage each other along a corresponding continuous U-shaped surfaces leaving an opening at the front, the housing cups being sealed together using a seal member that has a flexible portion corresponding to the U-shaped engagement surfaces, the seal member also including an attached or integrated front panel that has a central viewing pane, the front panel being surrounded by another flexible portion.

A unique aspect of the sealing member of embodiments of the present invention is the inclusion of the front panel, viewing pane and upper/lower housing seal in a single member. Embodiments of such sealing members include a flexible portion that fits between upper and lower housing cups or shells of a camera enclosure, and that also include an attached front panel with a viewing pane. The peripheral edge of the front panel is made of a flexible material which seals against the front opening defined by the housing shells. The viewing pane in these embodiments is integrally attached to the front panel by molding or other chemical bonding. The two ends of the flexible portion of the sealing members in these embodiments are attached to the front panel by molding or other chemical bonding, the flexible portion extending out in a generally perpendicular direction with respect to the orientation of the front panel. The result in these embodiments is a front panel having an integrated, sealed viewing pane therein, a peripheral flexible sealing surface around the front panel, and an integrally attached flexible sealing gasket that fits between upper and lower housing shells of the enclosure.

It is preferred that the mating surfaces of the housing shells be uniform and smooth in order to avoid unnecessary gaps or other potential failure points in the seal created when a the flexible portion of a sealing member of the present invention is placed between these surfaces. This may be accomplished by fabricating or molding each of the upper and lower housing shells as a single piece.

In some embodiments, the flexible portion of the sealing member may extend a significant distance out from the front panel. In these and other embodiments, it may be desirable to provide a means for aligning and holding the flexible portion of the sealing member against the lower housing shell before the upper shell is sealingly attached. As a result, in some embodiments, one or more small openings or notches may be provided along a non-sealing outside or lower lip of the flexible portion. These openings or notches are aligned with corresponding outwardly extending tabs on the lower housing shell. These openings/notches may be lined up with the tabs as the flexible portion of the sealing member is placed on the lower housing shell, such that the tabs fit into the openings/notches to hold the flexible portion in place on the lower housing. In some embodiments, one or more inwardly facing tabs may also be provided on the lower housing to engage an inner flange or ridge of the flexible portion.

In most embodiments, the sealing member is attached to the lower housing. In these embodiments, a pair of flanges are molded into the front panel portion of the sealing member. These flanges are provided on the inside, one flange on either side of the front panel. Each flange is provided with an opening through which a fastener (such as a bolt) is inserted. The fasteners pass through the flanges into receiving openings in the lower housing, holding the front panel and the remainder of the sealing member in place.

In some embodiments, the flexible sealing area surrounding the front panel includes a lower section below the two junctions where the two generally perpendicular ends of the larger flexible portion attach to the front panel, and an upper section above these two junctions. In these embodiments, each of these lower and upper sections includes at least one outwardly extending flexible ridge. In the lower section, the flexible lower ridge seals against an inside edge of the lower housing; and in the upper section, the flexible upper ridge seals against an inside edge of the upper housing. In some embodiments, the upper ridge of the upper section continues onto the larger flexible portion of the sealing member forming a long continuous ridge that extends along the length of the larger flexible portion and around the upper section of the front panel. In these embodiments, this upper ridge provides a single seal against the entire upper housing shell. In some embodiments, the lower ridge of the lower section continues onto the larger flexible portion of the sealing member forming a long continuous ridge that extends along the length of the larger flexible portion and around the lower section of the front panel. In these embodiments, this lower ridge provides a single seal against the entire lower housing shell. In some embodiments, both of these elongated ridges are provided.

In some embodiments a second ridge is provided in the upper section of the front panel. This second ridge is separate from and closer to the front of the panel than the first ridge, and follows the contours of the first ridge. This second ridge does not extend onto to the larger flexible portion of the sealing member, but ends just above each of the two junctions. This second ridge acts as a flashing to direct significant moisture away from the edges of the front panel, such as when a water hose is directed at this panel for cleaning. In these embodiments, the first ridge acts as the seal to prevent water from entering into the housing.

In some embodiments, the large flexible portion of the sealing member that is sandwiched between the upper and lower housing members may include a downwardly facing lower groove that receives an upwardly-extending peripheral flange of a lower housing member. In some embodiments, the flexible sandwiched section includes an upwardly extending ridge that seals against a peripheral edge of an upper housing member. In some embodiments, the flexible sandwiched section includes a second upwardly extending pointed ridge that is angled so as to fit into a peripheral shoulder formed in an upper housing member. In some embodiments, the aforementioned groove, first and second ridges are all provided on the same embodiment.

It is to be appreciated that any suitable arrangement of sealing grooves, ridges and/or flanges may be provided on the flexible surfaces of different embodiments of the sealing members of the present invention so long as such arrangements completely seal the interior of the enclosure when the upper and lower housing shells are attached together around the sealing member.

In some embodiments, one or more closable, sealable glands are provided in the lower housing to receive wires or cables for communication to and from the interior of the enclosure. These glands may be angled such that their exit from the lower housing is tilted toward the front such that wires or cables passing through the glands are directed at an angle toward the front of the housing. This allows the wires and cables exiting the enclosure to be easily enclosed or concealed in a mounting structure for the enclosure. This angle also improves the data transfer rate through the wires/cables which might otherwise be hampered by unnecessary bends and turns.

It is therefore an object of the present invention to provide systems, methods and apparatus for providing reliable sealed enclosures for surveillance cameras that are capable of protecting an internal surveillance camera and related electronics from harsh external environmental conditions without using adhesives.

It is also an object of the present invention to provide a unique sealing member for engagement between upper and lower housing shells of a camera enclosure, the sealing member having a first flexible portion that is sandwiched between the upper and lower housing shells, and a second front panel section having a central viewing pane.

It is also an object of the present invention to provide a sealed enclosure for a surveillance camera made up of upper and lower housing shells that are sealed together using a unique sealing member having a first flexible portion that is sealingy sandwiched between the upper and lower housing shells, and a second front panel section having a central viewing pane that seals a front opening formed by the housing shells.

It is also an object of the present invention to provide a sealed enclosure for a surveillance camera and its associated electronics that has favorably angled input and output glands for wires leading from the inside of the chamber.

Additional objects of the invention will be apparent from the detailed descriptions and the claims herein.

DETAILED DESCRIPTION

Figure 1:
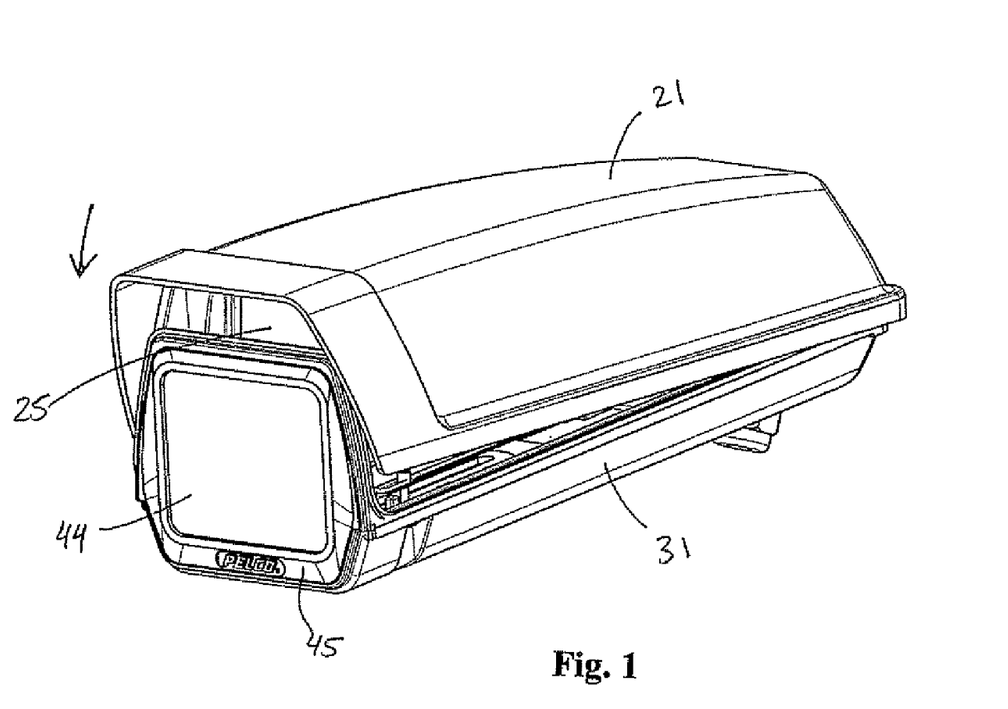
FIG. 1 is a front perspective exterior view of an embodiment of the present invention in a partially open condition.
Figure 1A:
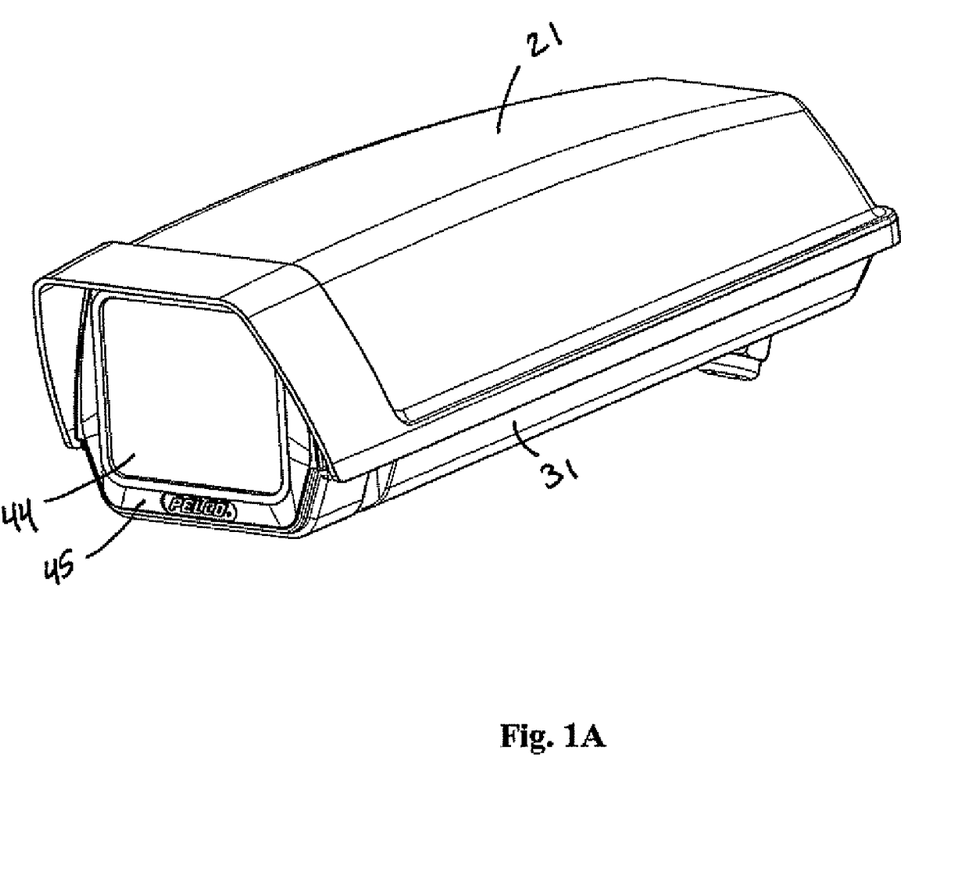
FIG. 1A is a front perspective exterior view of an embodiment of the present invention in a closed condition.
Figure 1B:
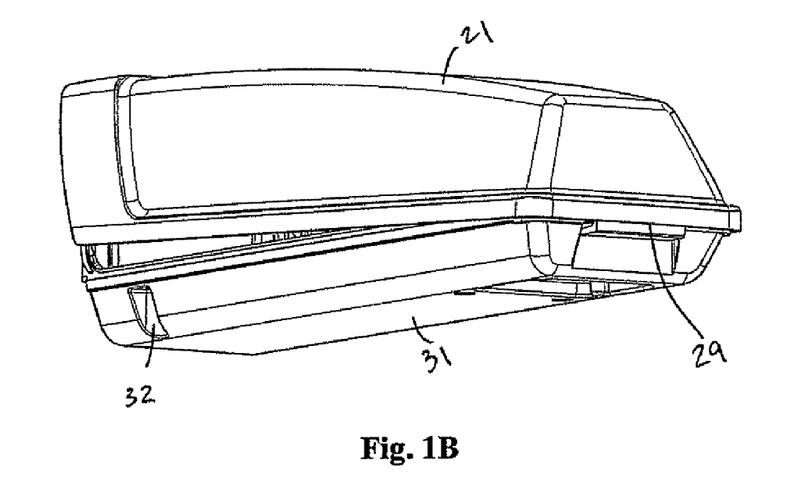
FIG. 1B is a rear perspective exterior view of an embodiment of the present invention.
Figure 1C:
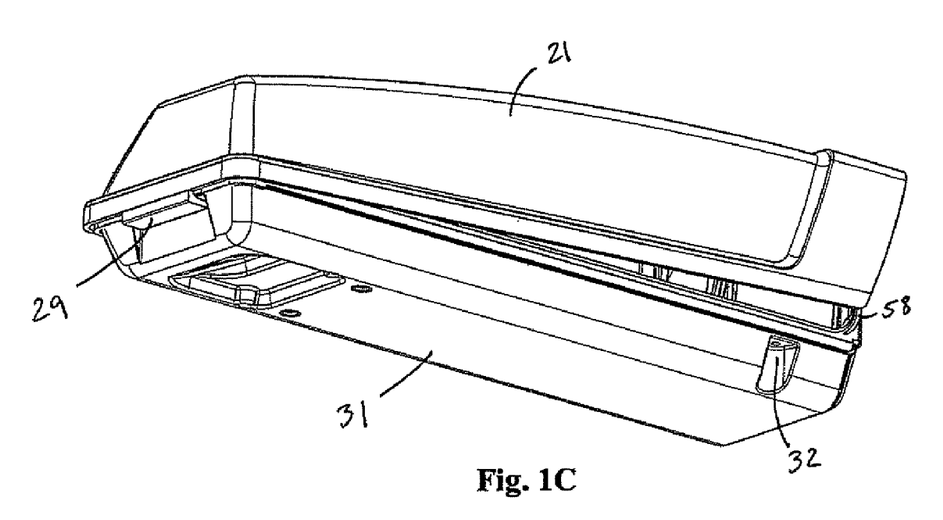
FIG. 1C is another rear perspective exterior view of the embodiment of FIG. 1B.
Figure 2:
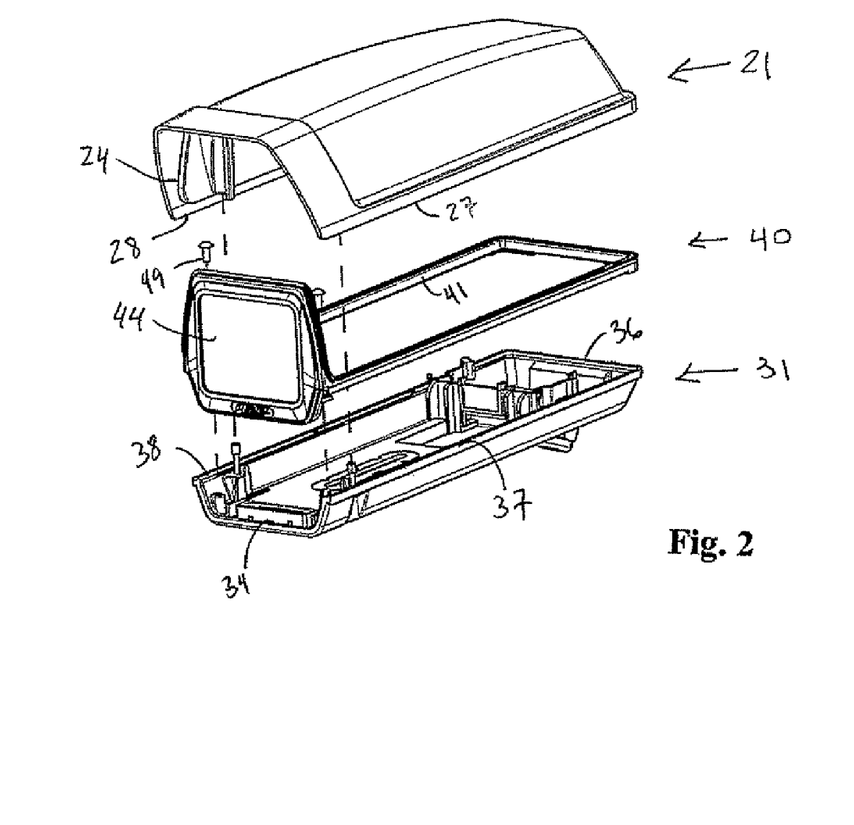
FIG. 2 is a perspective partially exploded upper view of the embodiment of FIG. 1
Figure 2A:
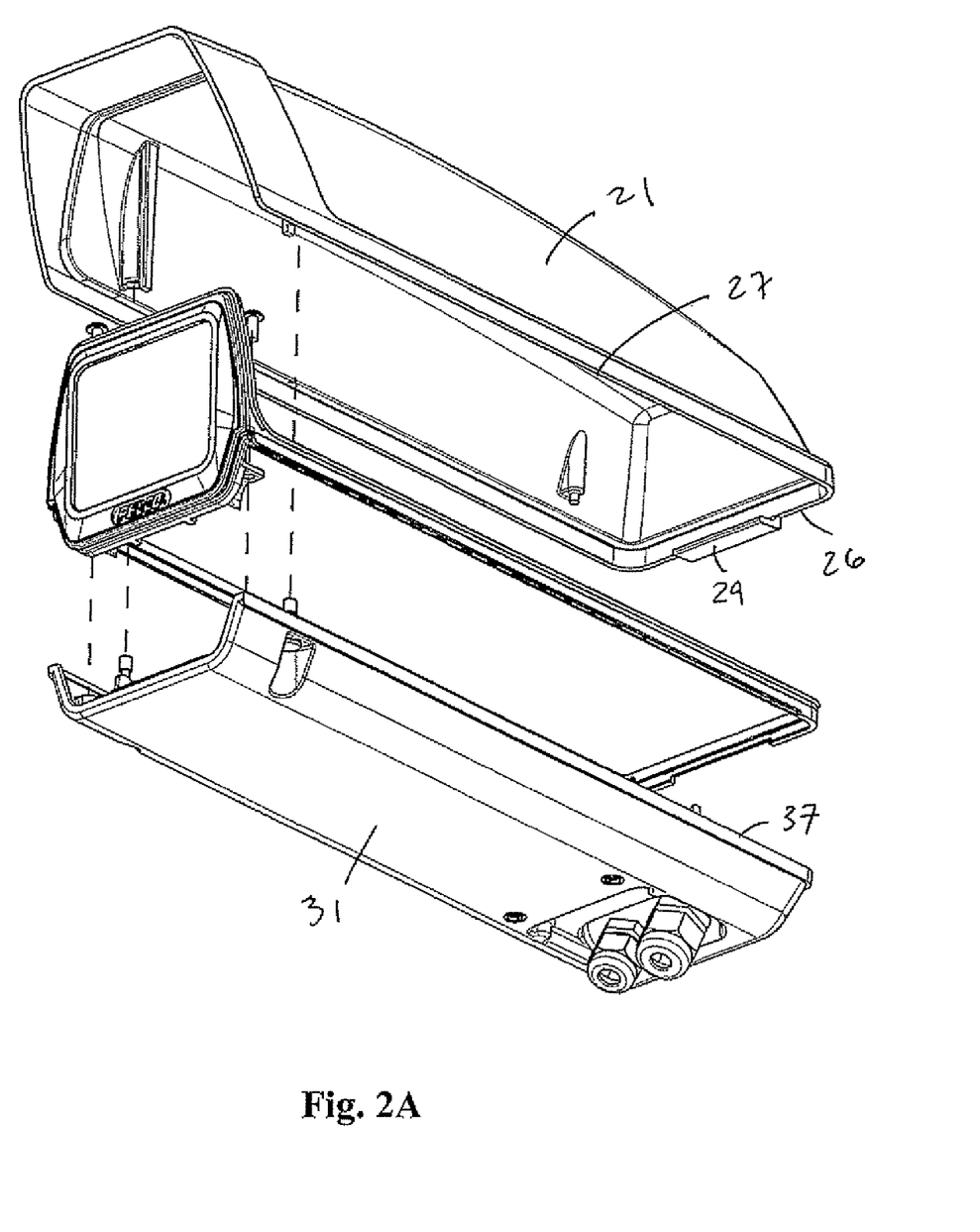
FIG. 2A is a perspective partially exploded lower view of the embodiment of FIG. 1
Figure 3:
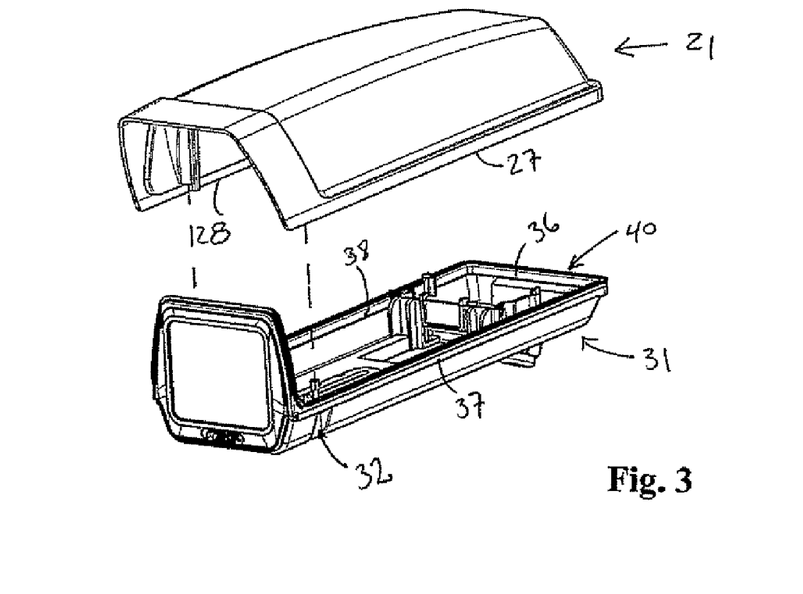
FIG. 3 is perspective partially exploded view of the embodiment of FIG. 1

Referring to the drawings wherein like reference characters designate like or corresponding parts throughout the several views, and referring particularly to FIGS. 2 and 3, it is seen that the illustrated exemplary embodiment of the present invention includes an upper housing shell 21, a lower housing shell 31, and a sealing or gasket member 40 that is sandwiched between the upper and lower housing sections 21, 31. Upper and lower housing shells 21, 31 may be hingedly engaged at the rear 29, as shown in FIGS. 1B and 1C, and then closed together around sealing member 40 as shown in FIG. 1A.

Figure 4:
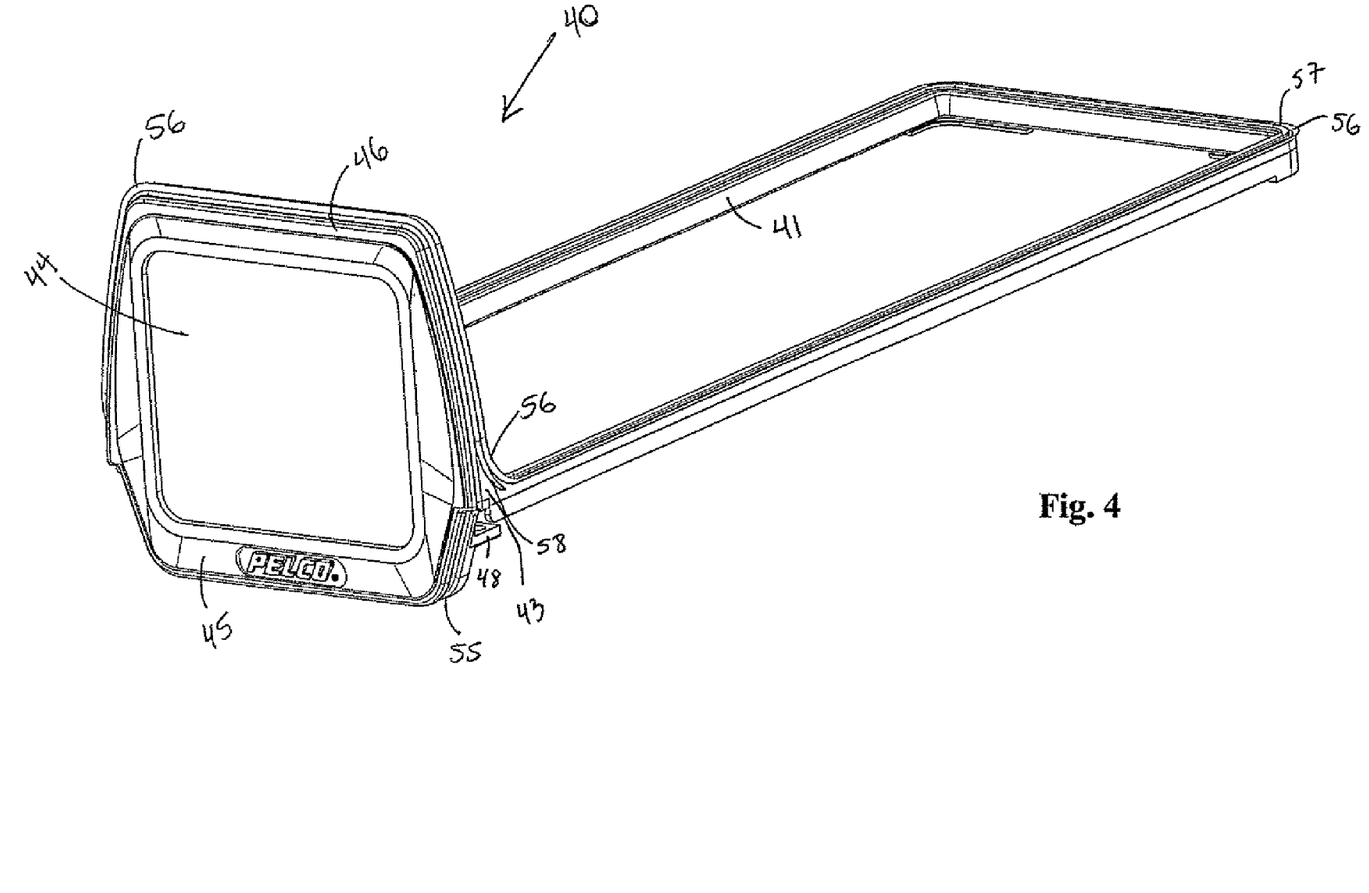
FIG. 4 is a front perspective view of an embodiment of a sealing member of the present invention.

Referring to FIGS. 2-4, it is seen that sealing member 40 includes a flexible portion 41 having a shape that corresponds to the surfaces of housing shells 21 and 31 to be engaged together. The flexible portion 41 of sealing member 40 is attached to or integrated into a front panel 45 having a central viewing pane 44. A flexible sealing surface 46 is provided around the perimeter of front panel 45. In the illustrated embodiments, the flexible portion 41 of sealing member 40 has a generally U-shaped configuration, with each end of the U attached to one side of front panel 45. It is to be appreciated that in alternative embodiments, flexible portion 41 may be of any suitable shape so as to conform to the mating surfaces of the upper and lower housing shells 21 and 31.

In the illustrated exemplary embodiments, the upper and lower housing shells 21, 31 hingedly couple at the rear and then engage each other along a corresponding continuous U-shaped surfaces with flexible portion 41 sandwiched between them as they are closed together. Shells 21 and 31 are held together at the rear by the hinge 29 and at the front by fasteners inserted into upper shell 21 from lower shell 31 at locations 32, as shown in exemplary embodiment of FIG. 3. This coupling of upper and lower housing shells 21, 31 leaves an opening 25 at the front. When upper and lower housing shells 21, 31 are closed against each other with sealing member 40 between them, flexible portion 41 is sealingly engaged between the edges of shells 21 and 31, and the flexible peripheral surface 46 of front panel 45 sealingly engages into opening 25.

Figure 4A:
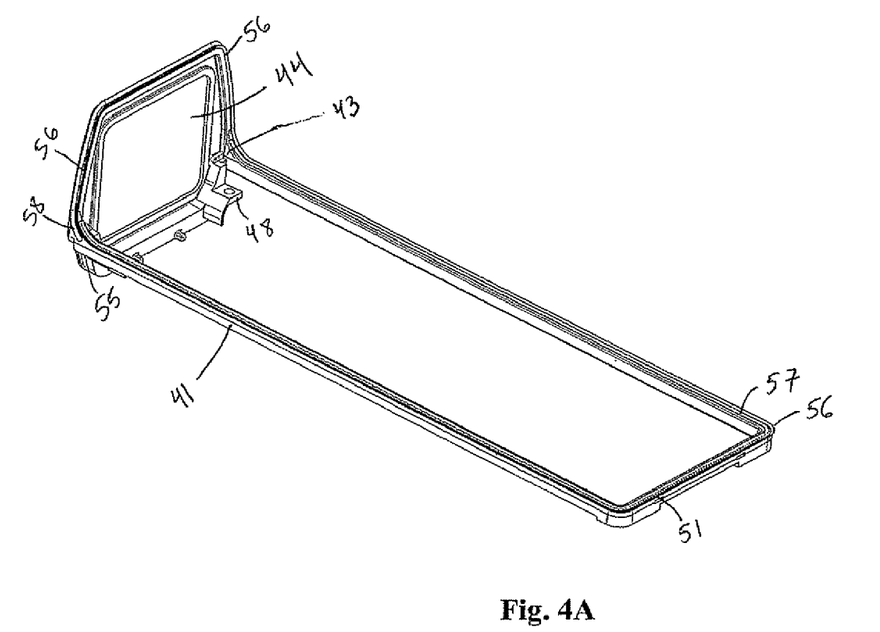
FIG. 4A is a rear upper perspective view of an embodiment of a sealing member of the present invention.
Figure 4B:
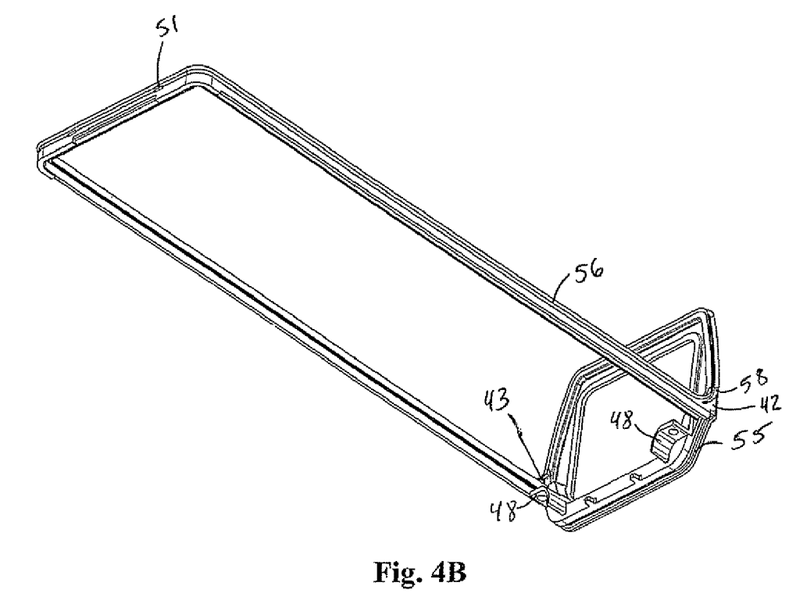
FIG. 4B is a rear lower perspective view of an embodiment of a sealing member of the present invention.

As shown in the exemplary embodiment of FIGS. 4, 4A and 4B, the sealing member 40 of embodiments of the present invention includes a front panel 45 with a viewing pane 44 and an upper/lower housing seal 41 all in a single member 40. The peripheral edge 46 of the front panel 45 is made of a flexible material which seals against the front opening 25 defined by the housing shells 21, 31. The viewing pane 44 in these embodiments may be sealingly attached to the front panel 45 by molding or chemical bonding. Flexible portion 41 is joined to front panel 45 in a generally perpendicular orientation at two junctions 42, 43 by molding or other chemical bonding.

In preferred embodiments, the mating surfaces 26, 36 and 27, 37 and 28, 38 of the housing shells should be uniform and smooth in order to avoid unnecessary gaps or other potential failure points in the seal created when a the flexible portion 41 of the sealing member 40 is placed between these pairs of surfaces.

Figures 5, 6:
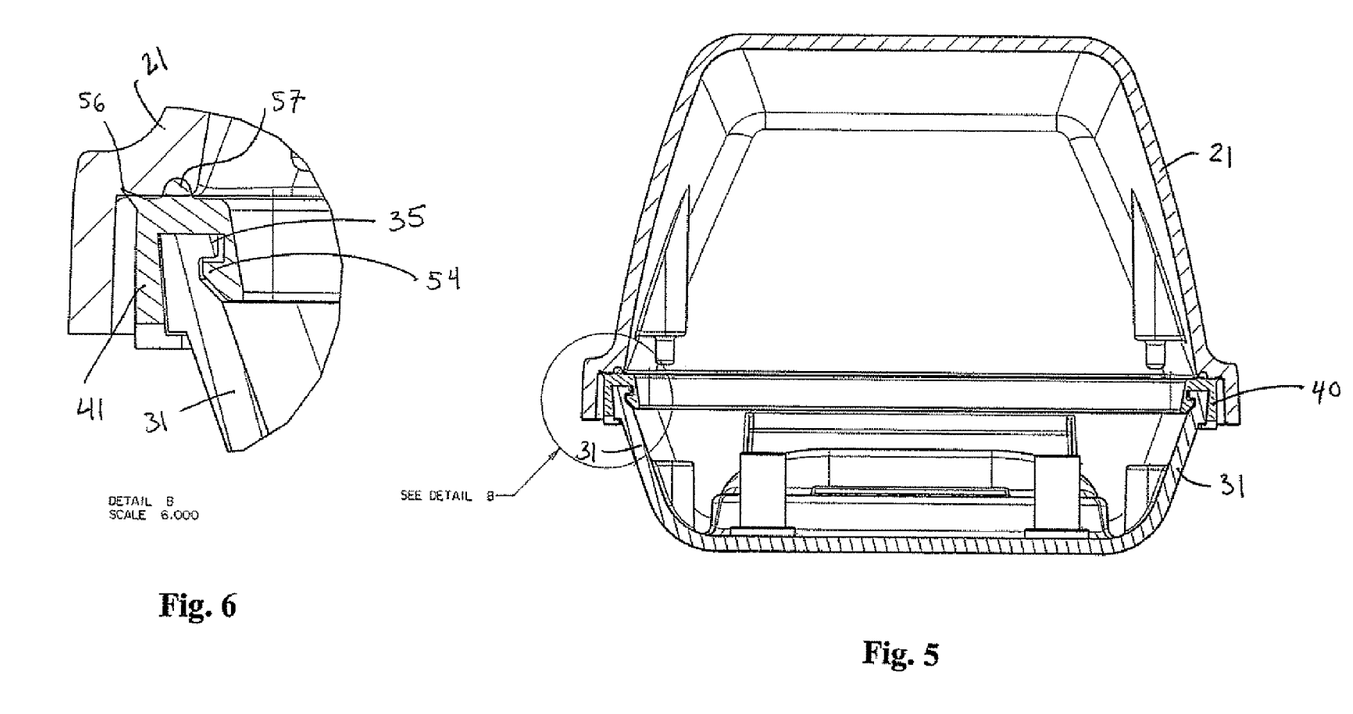
FIG. 5 is a front sectional view of an embodiment of the present invention.
FIG. 6 is a detailed view of area B of FIG. 5.
Figure 7:
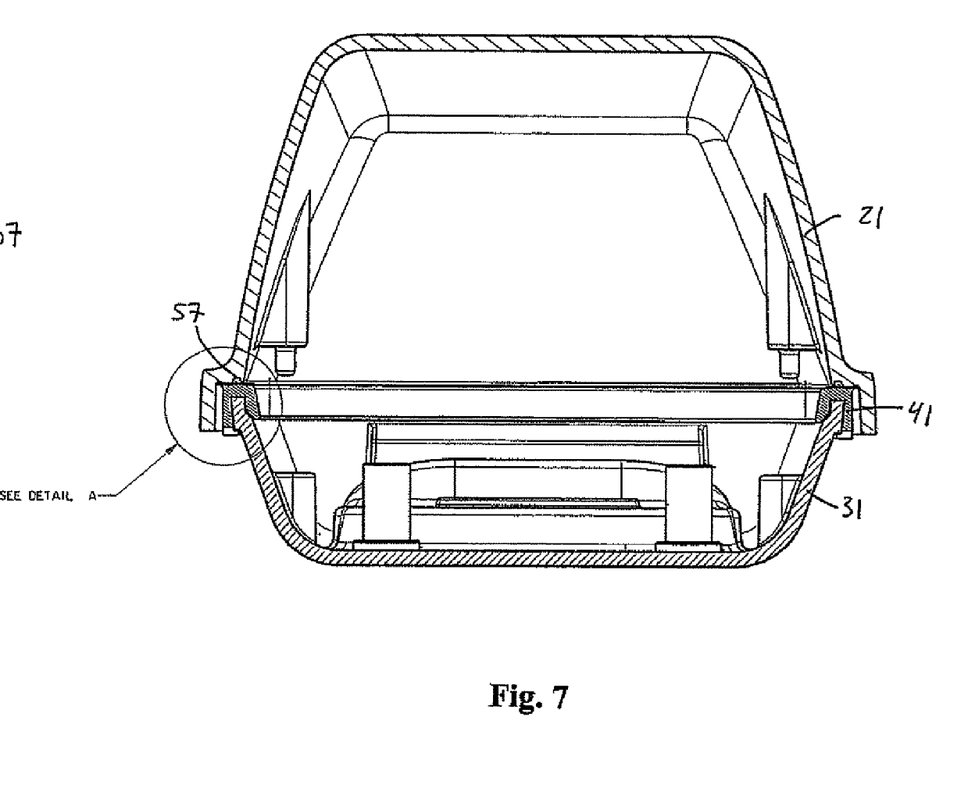
FIG. 7 is a front sectional view of an embodiment of the present invention.
Figure 8:
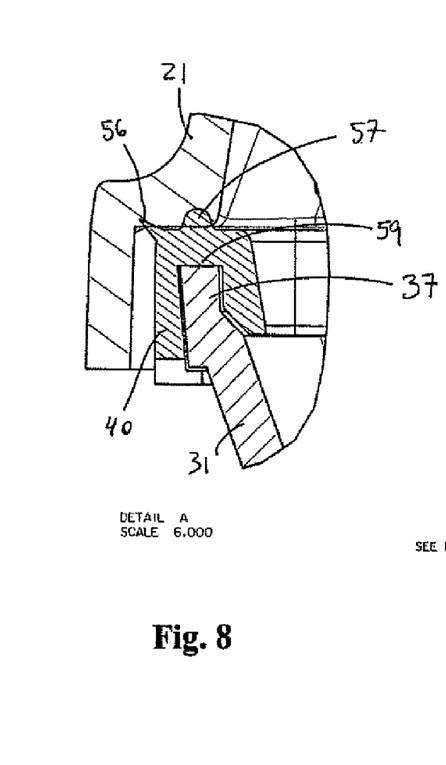
FIG. 8 is a detailed view of area A of FIG. 7.

In some embodiments, one or more small openings or notches 51 may be provided along a non-sealing outside or lower lip of the flexible portion 41. See FIGS. 4A and 4B. These openings or notches 51 are aligned with corresponding outwardly extending tabs 52 on the lower housing shell 31. These openings/notches 51 may be lined up with the tabs 52 as the flexible portion 41 is placed on the lower housing shell, such that the tabs fit into the openings/notches to hold the flexible portion in place on the lower housing 31. See FIGS. 9-11. In some embodiments, one or more inwardly facing tabs 35 may also be provided on the lower housing 31 to engage an inner flange or ridge 54 of the flexible portion 41. See FIGS. 5 and 6. In alternative embodiments, tabs 52 may be provided on upper housing 21 for engagement with similarly placed openings/notches 51 on flexible portion 41. Similarly, in alternative embodiments, tabs 35 may be provided on upper housing 21 to engage a corresponding flange or ridge 54 of flexible portion 41.

Figures 9, 11:
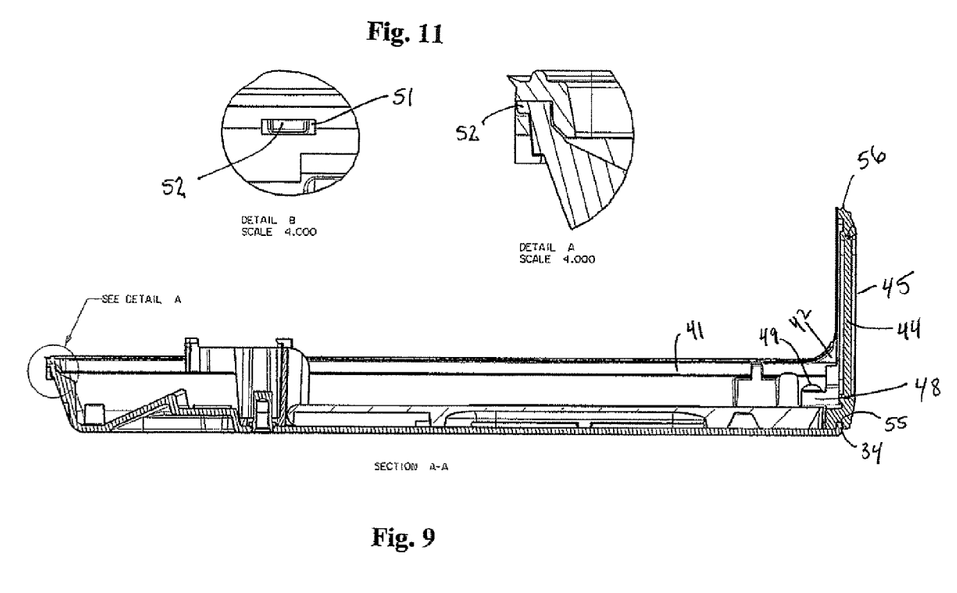
FIG. 9 is a side sectional view of an embodiment of the present invention.
FIG. 11 is a detailed view of areas A and B of FIGS. 9 and 10.
Figure 10:
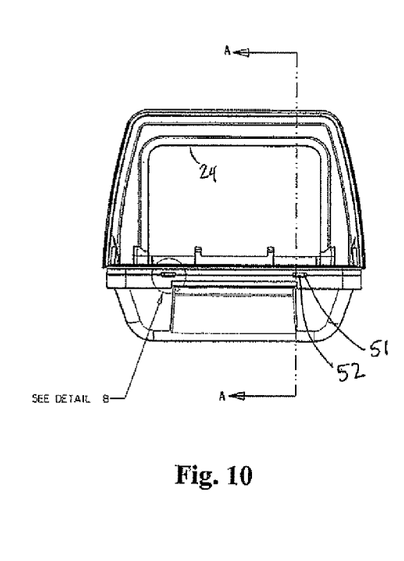
FIG. 10 is a rear end view of an embodiment of the present invention.
Figure 12:
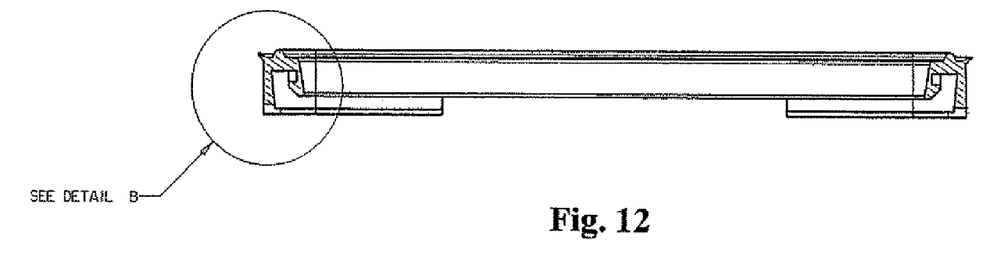
FIG. 12 is a rear sectional view of a sealing member embodiment such as that depicted in FIG. 4.
Figure 13:
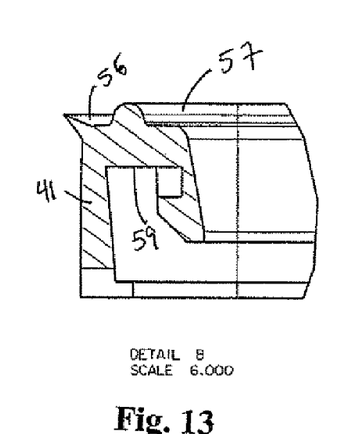
FIG. 13 is a detailed view of area B of FIG. 12.
Figure 14:
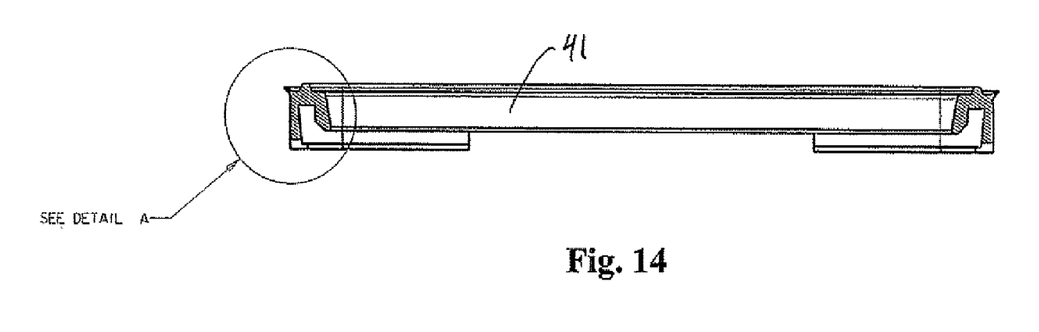
FIG. 14 is a rear sectional view of an alternative embodiment of a sealing member such as that depicted in FIG. 4.
Figure 15:
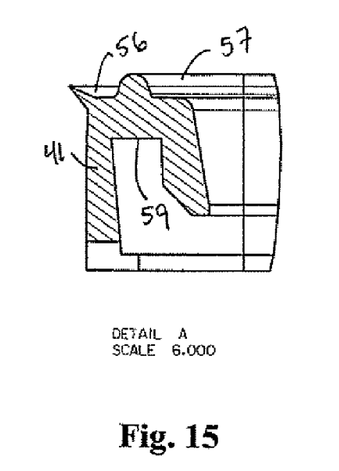
FIG. 15 is a detailed view of area A of FIG. 14.

In most embodiments, the sealing member 40 is attached onto the lower housing 31 as shown in FIG. 3. In these embodiments, a pair of flanges 48 are molded into the front panel portion of the sealing member. See FIG. 9. These flanges 48 are provided on the inside, one flange on either side of the front panel. Each flange 48 is provided with an opening through which a fastener (such as a bolt) 49 is inserted, as shown in FIG. 9. The fasteners 49 pass through the flanges 48 into receiving openings in the lower housing, holding the front panel and the remainder of the sealing member in place as shown in FIGS. 2 and 3. It is to be appreciated that in alternative embodiments, sealing member 40 may be similarly attached to upper housing 21.

In some embodiments, the flexible sealing area 46 surrounding the front panel includes a lower section below the two junctions 42, 43 where the two generally perpendicular ends of the larger flexible portion 41 attach to the front panel 45. An upper section is defined above these two junctions 42, 43. In the exemplary illustrated embodiments, the lower section may include a groove 55 which engages over a corresponding lip or ridge 34 of lower housing 31, as shown in FIGS. 2, 3 and 9. In alternative embodiments, a ridge may be provided (not shown) on flexible area 46 that engages against a mating surface on lower housing 31. In the exemplary illustrated embodiments, the upper section includes an outwardly extending flexible ridge 56 that fits into a groove or shoulder 24 on upper housing 21. However, in alternative embodiments, flexible area 46 may include a groove (not shown) that engaged with a ridge (not shown) on upper housing 21. In the illustrated exemplary lower section, the groove 55 seals over an upwardly extending ridge or lip 34 of the lower housing 31; and in the upper section, the flexible upper ridge 56 seals against an inside edge 24 of the upper housing 21.

In some embodiments, the upper ridge 56 of the upper section continues onto the larger flexible portion 41 of the sealing member 40 forming a long continuous ridge that extends along the length of the larger flexible portion and around the upper section of the front panel. See FIG. 4. In these embodiments, this upper ridge 56 provides a single seal against the entire upper housing shell 21. An additional ridge 57 is also provided along the entire length of the flexible portion 41 for sealing engagement against upper housing 21, as shown in FIGS. 5-8 and 12-15. In some embodiments (not shown), a lower ridge of the lower section continues onto the larger flexible portion 41 of the sealing member forming a long continuous ridge that extends along the length of the larger flexible portion and around the lower section of the front panel. In these embodiments, the lower ridge provides a single seal against the entire lower housing shell 21. In some embodiments, both of these elongated ridges are provided.

In some embodiments a second ridge 58 is provided in the upper section of the front panel as shown in FIG. 4. This second ridge 58 is separate from and closer to the front of the panel than the first ridge 56, and follows the contours of the first ridge 56. The second ridge 58 does not extend onto to the larger flexible portion 41 of the scaling member, but ends just above each of the two junctions 42, 42. This second ridge 58 acts as a flashing to direct significant moisture away from the edges of the front panel 45, such as when a water hose is directed at this panel for cleaning. In these embodiments, the first ridge 56 acts as the seal to prevent water from entering into the housing.

In some embodiments, the flexible portion 41 of the sealing member 40 sandwiched between the upper and lower housing members may include a downwardly facing lower groove 59 that receives an upwardly-extending peripheral flange 37 of the lower housing member 31. See FIGS. 7-8 and 14-15. In some embodiments, the flexible sandwiched section 41 includes an upwardly extending ridge 57 that seals against a peripheral edge of an upper housing member. In some embodiments, the flexible sandwiched section includes a second upwardly extending pointed ridge 56 that is angled so as to fit into a peripheral shoulder formed in an upper housing member. See FIGS. 5-8 and 12-15. In some embodiments, the aforementioned groove 59, first and second ridges 56, 57 are all provided on the same embodiment 41.

It is to be appreciated that any suitable arrangement of sealing grooves, ridges and/or flanges may be provided on the flexible surfaces of different embodiments the sealing members of the present invention so long as such arrangements completely seal the interior of the enclosure when the upper and lower housing shells are attached together around the sealing member.

Figure 16:
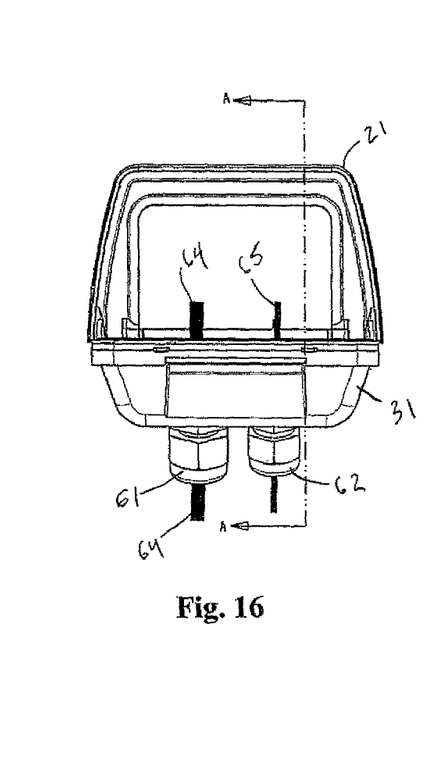
FIG. 16 is a rear end view of an embodiment of the present invention.
Figure 17:
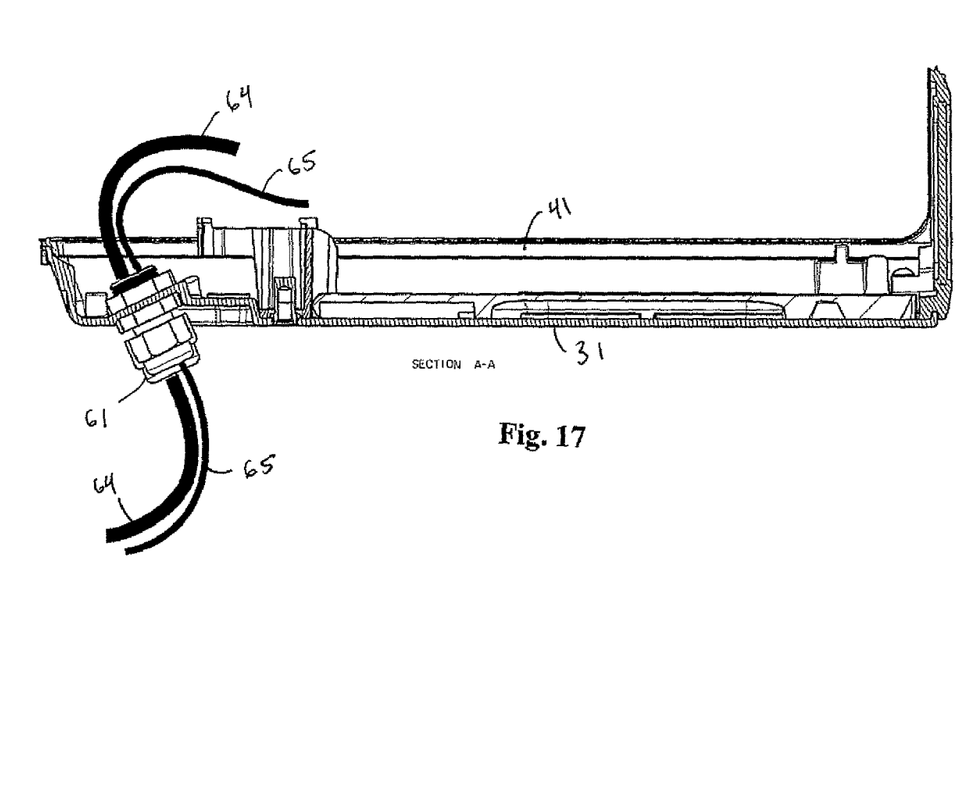
FIG. 17 is a side sectional view along line A-A of FIG. 16.

In some embodiments, the lower housing 31 includes at least one angled closable gland 61, 62 through which wires or cables 64, 65 may be passed for communication to and from the interior of the enclosure. Glands 61, 62 are angled such that their exit from housing 31 is tilted toward the front of the housing so that wires or cables passing through them are directed at an angle toward the front of the housing, as shown in FIGS. 16 and 17. This allows the wires and cables exiting the enclosure to be easily enclosed or concealed in a mounting structure for the enclosure. This angle also improves the data transfer rate through the wires/cables which might otherwise be hampered by unnecessary bends and turns.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An enclosure for a camera system comprising:
   a. an upper housing shell,
   b. a lower housing shell,
   c. a sealing member comprising a first flexible portion that is sandwiched between said upper and lower housing shells, and a second rigid portion attached to said first portion, said second portion comprising a front panel having a viewing pane therein, said front panel having a flexible sealing surface around the perimeter thereof.

2. The enclosure of claim 1 wherein said upper and lower housing shells have a front and a rear, and are hingedly engaged with each other at the rear.

3. The enclosure of claim 1 wherein said upper and lower housing shells define a front opening when closed against each other, and wherein the flexible sealing surface around said front panel seals against said front opening.

4. The enclosure of claim 1 wherein the flexible portion of said sealing member is bonded to said front panel at two locations on opposite sides of said front panel.

5. The enclosure of claim 4 wherein the orientation of the flexible portion of said sealing member is generally perpendicular with respect to said front panel.

6. The enclosure of claim 1 wherein at least one opening is provided at a non-sealing area of said first flexible portion and at least one tab is provided on one of said upper and lower housings such that said at least one tab fits into said at least one opening to hold said flexible portion in place on said housing.

7. The enclosure of claim 1 wherein at least one inwardly extending tab is provided on one of said upper and lower housings for engaging a lip on said flexible portion.

8. The enclosure of claim 1 wherein at least one flange is attached to said front panel, said flange having an opening therein for receiving a fastener for attaching said sealing member to one of said upper and lower housings.

9. The enclosure of claim 1 wherein a pair of flanges are provided on opposite sides of said front panel, each flange having an opening therein for receiving a fastener for attaching said sealing member to said lower housing.

10. The enclosure of claim 1 wherein a continuous flexible ridge is provided along the entire length of said flexible portion and an upper section of said front panel for sealing said flexible portion and front panel against said upper housing.

11. The enclosure of claim 1 wherein a continuous flexible ridge is provided along the entire length of said flexible portion and a lower section of said front panel for sealing said flexible portion and front panel against said lower housing.

12. The enclosure of claim 9 wherein a second ridge is provided on said front panel adjacent to said continuous ridge for directing moisture away from said front panel.

13. The enclosure of claim 9 wherein a second ridge is provided on said flexible portion adjacent to said continuous ridge for sealing engagement with said upper housing.

14. The enclosure of claim 1 wherein at least one gland is provided in said lower housing structure, said gland being angled toward the front of the enclosure.

15. A sealing member for insertion between upper and lower housing shells of a camera enclosure comprising a first flexible portion corresponding to the surfaces of said upper and lower housing shells, and a second rigid portion attached to said first portion, said second portion comprising a front panel having a central viewing pane therein and a flexible sealing surface around the perimeter thereof.

16. The sealing member of claim 15 wherein said first flexible portion is generally U-shaped.

17. The sealing member of claim 15 wherein the flexible portion of said sealing member is bonded to said front panel at two locations on opposite sides of said front panel.

18. The sealing member of claim 17 wherein the orientation of the flexible portion of said sealing member is generally perpendicular with respect to said front panel.

19. The sealing member of claim 17 wherein at least one opening is provided at a non-sealing area of said first flexible portion for engagement with at least one tab on one of said upper and lower housings.

20. The sealing member of claim 17 wherein at least one flange is attached to said front panel, said flange having an opening therein for receiving a fastener for attaching said sealing member to one of said upper and lower housings.

21. The sealing member of claim 17 wherein a continuous flexible ridge is provided along the entire length of said flexible portion and an upper section of said front panel for sealing said flexible portion and front panel against said upper housing.

22. The sealing member of claim 21 wherein a second ridge is provided on said front panel adjacent to said continuous ridge for directing moisture away from said front panel.

23. The sealing member of claim 21 wherein a second ridge is provided on said flexible portion adjacent to said continuous ridge for sealing engagement with said upper housing.

* * * * *